(12) United States Patent
Kanakamedala et al.

(10) Patent No.: US 9,673,668 B2
(45) Date of Patent: Jun. 6, 2017

(54) COMPRESSION BAND SHIM PACK FOR STATOR CORE, RELATED STATOR AND GENERATOR

(71) Applicant: General Electric Company, Schenectady, NY (US)

(72) Inventors: Lakshminarayana Kanakamedala, Glenville, NY (US); Richard Nils Dawson, Voorheesville, NY (US); Jayan Kaadaapuram George, Glenville, NY (US)

(73) Assignee: General Electric Company, Schenectady, NY (US)

( * ) Notice: Subject to any disclaimer, the term of this patent is extended or adjusted under 35 U.S.C. 154(b) by 251 days.

(21) Appl. No.: 14/490,266

(22) Filed: Sep. 18, 2014

(65) Prior Publication Data
US 2016/0087493 A1    Mar. 24, 2016

(51) Int. Cl.
*H02K 1/18*    (2006.01)
*H02K 1/20*    (2006.01)

(52) U.S. Cl.
CPC .............. *H02K 1/185* (2013.01); *H02K 1/18* (2013.01); *H02K 1/20* (2013.01)

(58) Field of Classification Search
CPC ............. H02K 1/18; H02K 1/185; H02K 1/20
USPC .... 310/216.008, 216.086, 216.087, 216.109, 310/216.126, 216.129
IPC ......................................................... H02K 1/18
See application file for complete search history.

(56) References Cited

U.S. PATENT DOCUMENTS

| | | | | |
|---|---|---|---|---|
| 2,761,987 A * | 9/1956 | Beckwith | ............... | H02K 1/185 310/216.049 |
| 2,846,603 A * | 8/1958 | Webster | ................. | H02K 1/185 310/216.129 |
| 3,659,129 A * | 4/1972 | Pettersen | ............... | H02K 17/16 310/211 |
| 4,564,779 A * | 1/1986 | Terry, Jr. | ................. | H02K 1/185 29/596 |
| 6,144,129 A * | 11/2000 | Fuller | ..................... | F16F 1/185 310/171 |
| 6,448,686 B1 | 9/2002 | Dawson et al. | | |
| 7,202,587 B2 | 4/2007 | Sargeant et al. | | |
| 7,923,890 B2 * | 4/2011 | Boardman, IV | ....... | H02K 1/185 310/216.129 |
| 8,138,654 B2 * | 3/2012 | Boardman, IV | ....... | H02K 1/185 310/216.007 |
| 8,179,028 B1 * | 5/2012 | Rao | ........................ | H02K 1/185 310/216.129 |
| 8,941,282 B2 * | 1/2015 | Allen | ....................... | H02K 1/16 310/216.008 |
| 2002/0070631 A1 * | 6/2002 | Dawson | ................. | H02K 1/185 29/596 |
| 2010/0295407 A1 * | 11/2010 | Boardman, IV | ....... | H02K 1/185 310/216.113 |

(Continued)

*Primary Examiner* — John K Kim
(74) *Attorney, Agent, or Firm* — Ernest G. Cusick; Hoffman Warnick LLC

(57) ABSTRACT

A shim pack to reduce vibration of a stator core is disclosed. The stator core may include a plurality of laminates coupled to a dovetail of a keybar and separated by a space block. The shim pack may include an elongated body extending from a first end including a dovetail slot configured to couple to the dovetail of the keybar to a second end extending radially at least substantially an entire length of an adjacent space block. A stator and related generator including the shim pack may also be provided.

17 Claims, 4 Drawing Sheets

(56) References Cited

U.S. PATENT DOCUMENTS

2016/0087493 A1* 3/2016 Kanakamedala ...... H02K 1/185
                                                          310/216.126

* cited by examiner

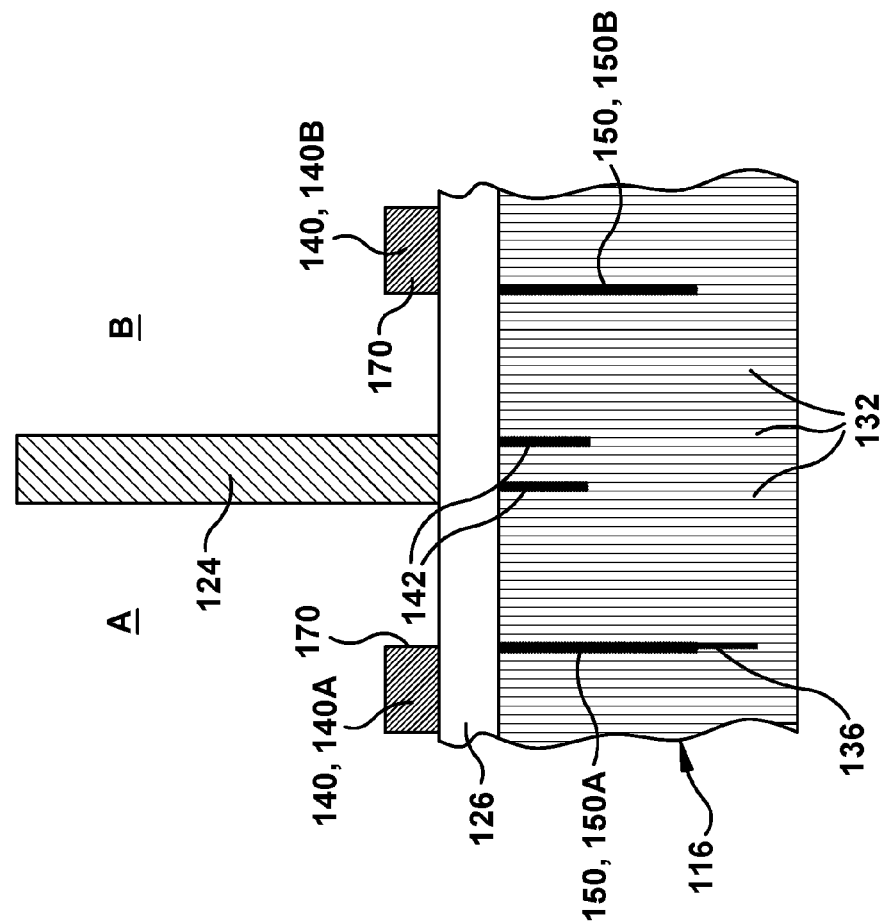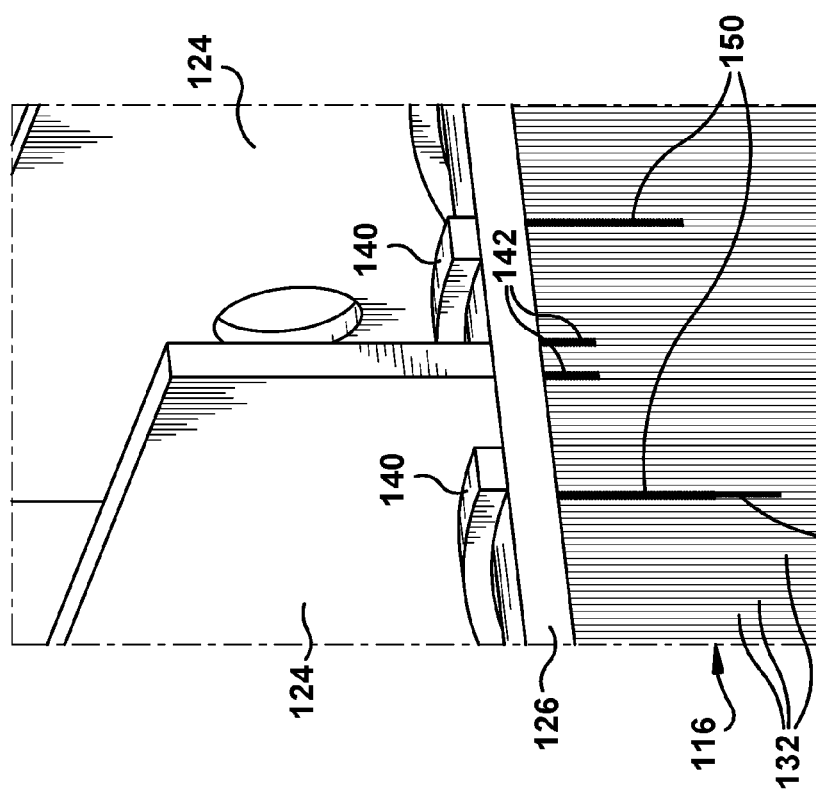

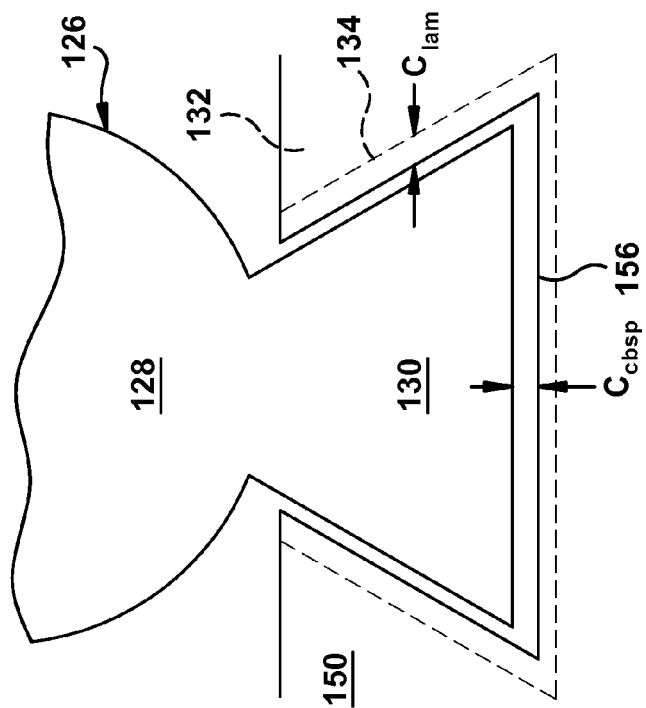
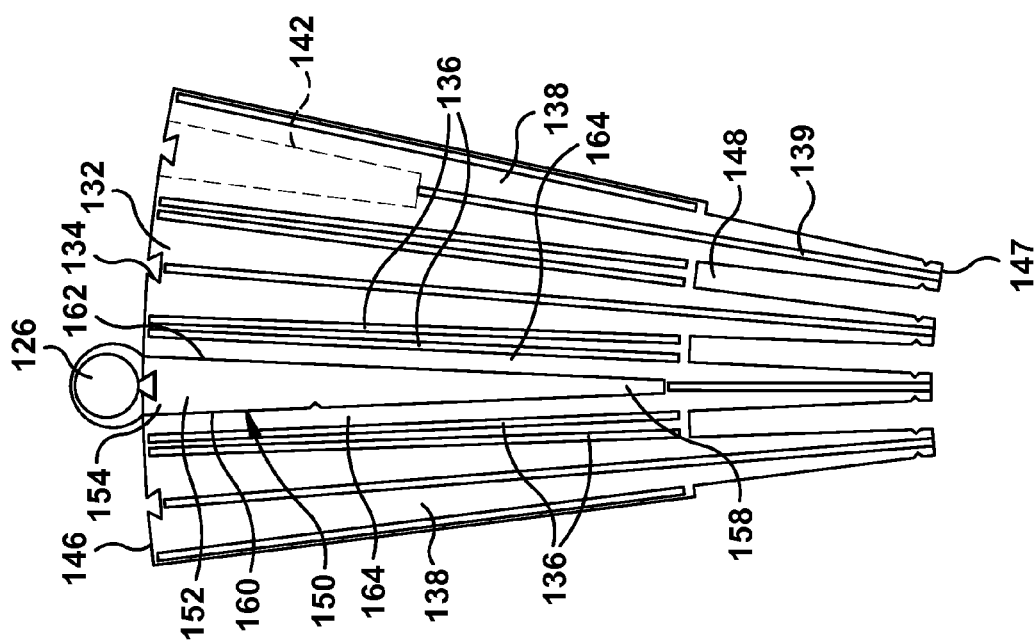

COMPRESSION BAND SHIM PACK FOR STATOR CORE, RELATED STATOR AND GENERATOR

BACKGROUND OF THE INVENTION

The disclosure relates generally to generator stator cores, and more particularly, to a compression band shim pack for a stator core and a related stator and generator.

Generators typically employ a combination of a rotor and a stator to convert rotational energy into electrical energy. The stator generally includes a stator core having multiple laminates stacked within an annular frame. In certain generator arrangements, multiple circumferentially spaced keybars are aligned with the longitudinal axis of and coupled to the annular frame. Dovetails within each keybar align with corresponding dovetail slots around the circumference of the stator core segments to secure the core to the annular frame. Due to tight tolerances between the dovetails and the slots, the frame is generally precisely machined to properly locate the dovetails. However, it is a challenge to maintain a stiff connection between the stator core and the annular frame of rigidly mounted generators over their life because of the operational vibrations that the generator creates. One approach to provide a stiff connection is to employ shim packs between stator core laminates where a section plate of the annular frame connects to the keybars.

BRIEF DESCRIPTION OF THE INVENTION

A first aspect of the disclosure provides a stator for a generator, the stator comprising: a stator frame including a section plate and a plurality of keybars connected to the section plate, each keybar including a dovetail; a compression band for radially compressing the keybars, the compression band extending about the plurality of keybars adjacent the section plate; a stator core including a plurality of laminates coupled to the plurality of keybars; and a compression band shim pack positioned between a pair of the plurality of laminates and axially adjacent to the compression band for axially compressing the plurality of laminates.

A second aspect of the disclosure provides a shim pack for a stator core including a plurality of laminates coupled to a dovetail of a keybar and separated by a space block, the shim pack comprising: an elongated body extending from a first end including a dovetail slot configured to couple to the dovetail of the keybar to a second end extending radially at least substantially an entire length of an adjacent space block.

A third aspect of the disclosure provides a generator comprising: a rotor having a rotational axis; a stator disposed about the rotor, the stator including: a stator frame including a section plate and a plurality of keybars connected to the section plate, each keybar including a dovetail; a compression band for radially compressing the keybars, the compression band extending about the plurality of keybars adjacent the section plate; a stator core including a plurality of laminates coupled to the plurality of keybars; and a compression band shim pack positioned between a pair of the plurality of laminates and axially adjacent to the compression band for axially compressing the plurality of laminates.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 3 shows an enlarged perspective view a portion of the stator including a compression band shim pack according to embodiments of the disclosure.

FIG. 4 shows a schematic view of a portion of the stator including the shim pack according to embodiments of the disclosure.

FIG. 5 shows a side view of a portion of a stator core laminate including space blocks and a shim pack according to embodiments of the disclosure.

FIG. 6 shows a cross-sectional view of a portion of a keybar in a dovetail slot of the shim pack and stator core laminate according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a shim pack for a stator core and a related stator and generator.

Figure 1:
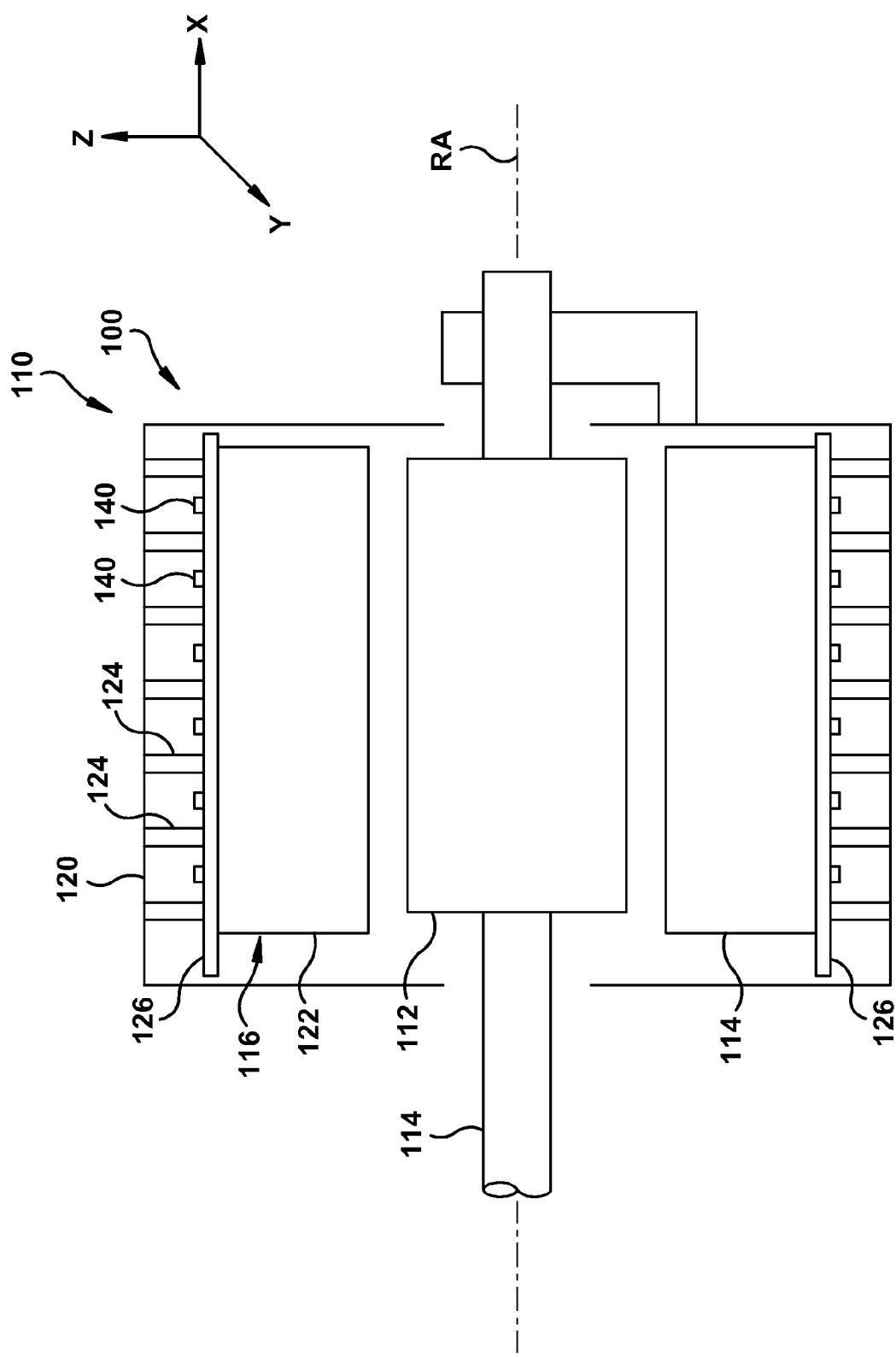
FIG. 1 shows a simplified cross-sectional side view of a generator including a stator according to embodiments of the disclosure.
Figure 2:
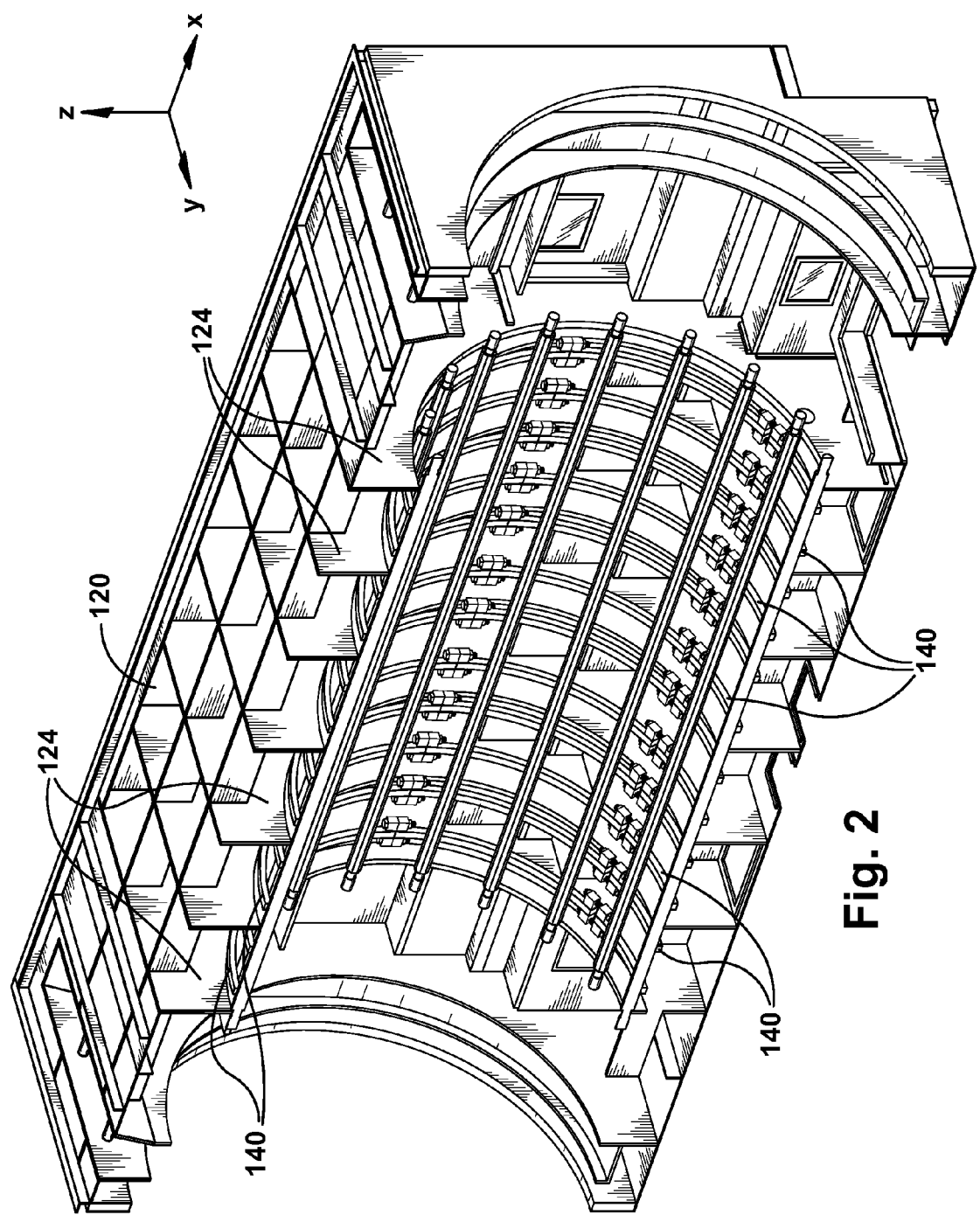
FIG. 2 shows a cutaway perspective view of a stator frame of the generator of FIG. 1 according to embodiments of the disclosure.

Referring to the drawings, FIG. 1 shows a simplified cross-sectional side view of a generator 100 that may serve as the generator in, for example, a combined cycle power generation system, or various other power generation systems. FIG. 2 shows a cutaway perspective view of a stator frame 110 that may be used in generator 100 of FIG. 1. As shown in FIG. 1, generator 100 includes a stator frame 110, a rotor 112 including a shaft 114 having a rotational axis RA, and a stator 116 disposed about rotor 112. Shaft 114 may be driven to rotate about a rotational axis by, for example, a gas turbine, a steam turbine, a wind turbine, a hydro turbine, an internal combustion engine, or any other suitable device configured to provide a rotational output. Shaft 114 is coupled to a substantially cylindrical rotor 112 that may include a wire winding about a magnetic core. Rotor 112 is disposed within stator 116, which is configured to provide a stationary magnetic field. As appreciated, rotation of rotor 112 within stator 114 may generate electrical current within the wire winding, thereby producing an electrical output from generator 100.

Stator 116, including a stator core 122 thereof, is substantially rigidly supported within stator frame 110 which includes section plates 124 and a plurality of keybars 126 connected to stator frame 110. As shown in FIGS. 1 and 2, stator frame 110 may include a casing 120 that surrounds the rest of the frame. As shown best in FIG. 2, section plates 124 are annular supports or hollow disk-shaped plates that extend radially and are substantially equally spaced in an axial direction X along a length of stator frame 110. As illustrated, stator frame 110 includes nine section plates 124.

In alternative configurations, frame 110 may include more or fewer section plates 124, such as 3, 5, 7, 10, 15, 20, or more section plates 124, for example.

As also shown in FIG. 2, keybars 126 are fixedly coupled to section plates 124 and extend axially relative to rotational axis X. Keybars 126 may be fixedly coupled using, for example, welding, bolts or other known coupling systems. In most cases, keybars 126 are equally spaced about the circumference of stator frame 110. Referring to FIG. 6, as is common, each keybar 126 includes a mounting portion 128 for coupling to section plates 124 and a dovetail 130 (FIG. 6) for coupling with a plurality of stator core laminates 132 of stator core 122 (FIG. 1).

As shown in FIG. 3, stator 116 may include a stator core 122. Stator core 122 may include a plurality of laminates 132 that are stacked together to form the core. Groups of laminates may be referred to as core segments. Each laminate 132 includes circumferentially spaced dovetail slots 134 (in phantom in FIG. 6) that are aligned when stacked for coupling to keybars 126. More specifically, each dovetail slot 134 (FIG. 6) may be configured to interlock with a dovetail 130 (FIG. 6) of each keybar 126, securing keybars 126 to laminates 132 at locations corresponding to dovetail slots 134 (FIG. 6). Alternative embodiments may include more or fewer keybars 126, such as 5, 10, 20, 25, 30, 35 or more keybars 126. As understood in the art, and as shown best in FIG. 5, groups of laminates 132 may be axially spaced by (inside) space blocks 136, which create radially extending vents 138 between laminates 132. Some space blocks 136 extend from a radial outer edge 146 of laminates 132 to stator winding slots 148 in laminates 132, and other space blocks 139 extend from radial outer edge 146 of laminates 132 to an inner radial edge 147 of laminates 132.

Referring to FIGS. 1-4, stator 116 may also include a compression band 140 for radially compressing keybars 126. Compression bands 140 may also be referred to as ring assemblies. As illustrated, compression band 140 extends about keybars 126 adjacent section plate 124. For example, as shown in FIG. 2, a compression band 140 may be positioned between each pair of section plates 124. In operation, compression bands 140 are tensioned to compress keybars 126 to stiffen the connection with the rest of stator frame 110, and reduce vibration.

As shown in FIGS. 3 and 4, stator 116 may also optionally include a section plate shim pack(s) 142 positioned adjacent to section plate(s) 124. While two section plate shim packs 142 are illustrated, zero, one or more than two may be employed. Section plate shim pack 142 may include a plurality of laminates (not labeled), e.g., of material similar to laminates 132 which are typically steel but may be other materials also. As understood in the art, a section plate shim pack 144 may be placed between a pair of stator core laminates 132 to axially compress the laminates 132 in the vicinity of section plate(s) 124 to reduce vibration and stiffen the connection with section plate 124. Shim packs 142, however, only address vibrations where section plates 124 exist. Structurally, as shown in phantom in FIG. 5, section plate shim packs 142 extend about half the radial distance of those space blocks 136 that extend from a radial outer edge 146 of laminates 132 to stator winding slots 148 in laminates 132. Space blocks 136 may be radially aligned with stator winding slots 148. As understood, stator winding slots 148 receive wiring that forms part of stator 116. As noted herein, other space blocks 139 may extend from radial outer edge 146 of laminates 132 between stator winding slots 148 to inner radial edge 147 of laminates 132. As shown in FIG. 5, section plate shim pack 142 takes the place of only part of a space block 139. Consequently, section plate shim pack 142 is typically substantially trapezoidal in shape. Section plate shim pack 142 may have an axial dimension (into/out of page of FIG. 5) larger than an axial dimension of space blocks 136, 139 so as to form the axial compression force on laminates 132 as they are axially clamped together in a known fashion, e.g., end clamping systems. A tight tolerance between shim pack 142 and keybar 126 provides connection stiffness between stator core 122 and stator frame 110.

In accordance with embodiments of the invention, stator 116 may include a compression band shim pack 150 positioned between a pair of the plurality of laminates 132 and radially within compression band 140 for axially compressing the plurality of laminates 132, i.e., in the vicinity of compression band 140. Compression band shim pack 150 thus reduces vibration at compression band(s) 140, providing additional connection stiffness and vibration reduction radially along stator 116. As shown best in FIG. 5, in contrast to section plate shim pack 142, compression band shim pack 150 includes an elongated body 152 extending from a first end 154 including a dovetail slot 156 (see FIG. 6) configured to couple to dovetail 130 (FIG. 6) of keybar 126 to a second end 158 extending radially at least substantially an entire length of an adjacent space block 136, i.e., almost to a point in the same radius as stator winding slots 148. Consequently, compression band shim pack 150 may be substantially triangular in shape. In addition, as can be observed in FIG. 5, compression band shim pack 150 may have a length greater than section plate shim pack 142. Although a particular length has been illustrated, it is understood that compression band shim pack 150 may be shorter or longer than shown, and can also be shorter or equal in length to section plate shim pack 142. In any event, compression band shim pack 150 has an axial dimension (into/out of page of FIG. 5) larger than an axial dimension of space blocks 136, 139 so as to form the axial compression force on laminates 132 as they are axially clamped together in a known fashion. Compression band shim pack 150 may be made of a plurality of laminates, e.g., of material similar to laminates 132 which are typically steel. The number of laminates in pack 150 may depends on a length of space blocks 136. As also shown in FIG. 5, compression band shim pack 150 includes a pair of opposing sides 160, 162 configured to create a vent space 164 between each opposing side 160, 162 and an adjacent space block 136 (as illustrated on both sides). In this fashion, use of compression band shim pack 150 does not hinder ventilation typically provided by space blocks 136, 139.

Referring to FIG. 4, compression band shim packs 150 are placed as close as possible to section plates 124 and compression bands 140 are placed near compression band shim packs 150. In one embodiment, one or more compression band shim packs 150B may be radially aligned with an axial end 170 of a respective compression band 140B. However, this is not necessary, and compression band shim pack(s), e.g., 150A, may be located anywhere, radially within compression band, e.g., 140A. In the example shown, a first compression band 140A extends about keybars 126 adjacent a first axial side A of section plate 124, and a second compression band 140B extends about keybars 126 adjacent an opposing, second axial side B of section plate 124. In this case, a first compression band shim pack 150A may be positioned radially within first compression band 140A, and a second compression band shim pack 150B may be radially within second compression band 140B. Compression band shim packs 150A, 150B may be positioned in substantially similar relative positions relative to respective compression bands 140A, 140B so as to balanced axial compression about section plate 124. For example, compression band shim packs 150A, 150B may be radially aligned with an axial end 170 of a respective compression bands 140A, 140B, respectively, that is closest to section plate 124, which may provide a balanced axial compression about section plate 124 (pack 150A would be more to right than illustrated in this case). However, as illustrated, similar positioning is not necessary in all instances.

Referring to FIG. 6, as described herein, each stator core laminate 132 includes dovetail slot 134 formed therein for engaging one of the plurality of keybars 126, i.e., a dovetail 130 thereof. In addition, as described herein, compression band shim pack 150 includes dovetail slot 156 formed therein for engaging the one of the plurality of keybars (dovetail 130). In addition, in order to provide additional vibration reduction and/or stiffness to stator 116, dovetail slot 156 of compression band shim pack 150 has a cross-sectional area which is smaller than a cross-sectional area of dovetail slot 134 of stator core laminates 132. In one example, a clearance $C_{cbsp}$ of dovetail slot 156 with dovetail 130 may be much smaller than a clearance $C_{lam}$ of dovetail slot 134 of laminates 132, e.g., approximately 15% of clearance $C_{lam}$. For example, clearance $C_{cbsp}$ may be about 0.005 centimeters (cm) and clearance $C_{lam}$ may be about 0.03 cm. Other clearances may also be possible depending on the size of stator 116.

In operation, when compression bands 140 are tightened, they press keybars 126 radially inward against compression band shim packs 150 and establish a more rigid connection between shim pack and keybar. This arrangement also results in a more rigid, i.e., less vibratory, connection between stator core 122 and stator frame 110, i.e., section plates 124, etc., as compression band shim packs 150 are held inside stator core 122 with pressure and keybars 126 are coupled to sections plates 124. This approach using compression band shim packs 150 and compression bands 140 establishes a controlled connection stiffness, and assists in maintaining the stiffness over the life of generator 100.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A stator for a generator, the stator comprising:
    a stator frame including:
        a section plate; and
        a plurality of keybars connected to the section plate, each keybar including a dovetail;
    a compression band for radially compressing the keybars, the compression band extending about the plurality of keybars adjacent the section plate;
    a stator core including:
        a plurality of laminates coupled to the plurality of keybars; and
    a compression band shim pack positioned between a pair of the plurality of laminates and radially aligned with the compression band, the compression band shim pack configured to axially compress the pair of the plurality of laminates.

2. The stator of claim 1, further comprising a space block between the pair of the plurality of laminates, and wherein the compression band shim pack has an axial dimension larger than an axial dimension of the space block.

3. The stator of claim 1, further comprising a section plate shim pack positioned adjacent to the section plate.

4. The stator of claim 3, wherein the compression band shim pack has a length greater than the section plate shim pack.

5. The stator of claim 1, wherein the compression band shim pack includes a pair of opposing sides configured to create a vent space between each opposing side and an adjacent space block.

6. The stator of claim 1, wherein each laminate includes a first dovetail slot formed therein for engaging one of the plurality of keybars, and wherein the compression band shim pack includes a second dovetail slot formed therein for engaging the one of the plurality of keybars, and
    wherein the second dovetail slot has a cross-sectional area which is smaller than a cross-sectional area of the first dovetail slot.

7. The stator of claim 6, wherein the compression band shim pack includes an elongated body extending from a first end including the second dovetail slot to a second end extending radially at least substantially an entire length of an adjacent space block between a pair of the plurality of laminates.

8. The stator of claim 1, wherein the compression band shim pack is positioned radially within the compression band.

9. The stator of claim 1, wherein the compression band shim pack includes a plurality of laminates.

10. The stator of claim 1, wherein the compression band includes:
    a first compression band extending about the plurality of keybars adjacent a first axial side of the section plate for radially compressing the keybars, and
    a second compression band extending about the plurality of keybars adjacent an opposing, second axial side of the section plate for radially compressing the keybars; and
    wherein the compression band shim pack includes:
    a first compression band shim pack positioned radially within the first compression band, and
    a second compression band shim pack radially within the second compression band.

11. The stator of claim 10, wherein each compression band shim pack is radially aligned with an axial end of the respective first and second compression band closest to the section plate.

12. A generator comprising:
a rotor having a rotational axis; and
a stator disposed about the rotor, the stator including:
  a stator frame including:
    a section plate; and
    a plurality of keybars connected to the section plate, each keybar including a dovetail;
  a compression band for radially compressing the keybars, the compression band extending about the plurality of keybars adjacent the section plate;
  a stator core including:
    a plurality of laminates coupled to the plurality of keybars; and
    a compression band shim pack positioned between a pair of the plurality of laminates and radially aligned with the compression band, the compression band shim pack configured to axially compress the pair of the plurality of laminates.

13. The generator of claim 12, further comprising a space block between the pair of the plurality of laminates, and wherein the compression band shim pack has an axial dimension larger than an axial dimension of the space block.

14. The generator of claim 12, further comprising a section plate shim pack positioned adjacent to the section plate, and wherein the compression band shim pack has a length greater than the section plate shim pack.

15. The generator of claim 12, wherein each laminate includes a first dovetail slot formed therein for engaging one of the plurality of keybars, and wherein the compression band shim pack includes a second dovetail slot formed therein for engaging the one of the plurality of keybars, and wherein the second dovetail slot has a cross-sectional area which is smaller than a cross-sectional area of the first dovetail slot.

16. The stator of claim 15, wherein the compression band shim pack includes an elongated body extending from a first end including the second dovetail slot to a second end extending radially at least substantially an entire length of an adjacent space block between a pair of the plurality of laminates.

17. A stator for a generator, the stator comprising:
  a stator frame including:
    a section plate; and
    a plurality of keybars connected to the section plate, each keybar including a dovetail;
  a compression band for radially compressing the keybars, the compression band extending about the plurality of keybars adjacent the section plate;
  a stator core including a plurality of laminates coupled to the plurality of keybars;
  a space block positioned between a pair of the plurality of laminates; and
  a compression band shim pack positioned between the pair of the plurality of laminates and radially aligned with the compression band, the compression band shim pack configured to axially compress the pair of the plurality of laminates,
  wherein the compression band shim pack has an axial dimension larger than an axial dimension of the space block.

* * * * *